United States Patent
Pawlowski et al.

[11] Patent Number: 6,142,578
[45] Date of Patent: *Nov. 7, 2000

[54] WHEEL FOR ROLLER SKATES OF THE INLINE SKATE TYPE

[76] Inventors: Christoph Pawlowski, Nordenhamer Strasse 231, 27751 Delmenhorst; Günter Langer, Walter-Flex-Weg 24b, 27753 Delmenhorst; Wilhelm Meyer, Buchenstrasse 19, 26919 Brake, all of Germany

[*] Notice: This patent issued on a continued prosecution application filed under 37 CFR 1.53(d), and is subject to the twenty year patent term provisions of 35 U.S.C. 154(a)(2).

[21] Appl. No.: 08/923,202

[22] Filed: Sep. 4, 1997

[30] Foreign Application Priority Data

Sep. 5, 1996 [DE] Germany ........................ 296 15 350 U
Sep. 5, 1996 [DE] Germany ........................ 296 15 351 U

[51] Int. Cl.[7] .................................................. B60B 19/00
[52] U.S. Cl. ......................................... 301/5.7; 301/105.1
[58] Field of Search ..................... 301/5.3, 5.7, 105.1; 280/11.22, 11.23

[56] References Cited

U.S. PATENT DOCUMENTS

| | | | |
|---|---|---|---|
| 1,983,869 | 12/1934 | Nichol | 301/5.7 X |
| 2,689,769 | 9/1954 | Ware, Jr. | 301/5.7 |
| 2,734,777 | 2/1956 | Jewett | 301/5.7 |
| 3,823,952 | 7/1974 | Kukulowicz . | |
| 4,898,403 | 2/1990 | Johnson . | |
| 5,048,848 | 9/1991 | Olson et al. | 301/5.7 X |
| 5,362,075 | 11/1994 | Szendel | 301/5.7 X |
| 5,443,277 | 8/1995 | Kubierschky | 301/5.7 X |
| 5,478,140 | 12/1995 | Racosky | 301/5.7 |
| 5,660,447 | 8/1997 | Angelici | 301/5.7 |
| 5,853,227 | 12/1998 | Schmidt, III | 301/5.7 |

FOREIGN PATENT DOCUMENTS

| | | | |
|---|---|---|---|
| 2244840 | 3/1974 | Germany | 301/5.7 |
| 126202 | 7/1983 | Japan | 301/5.7 |
| 9426366 | 11/1994 | WIPO . | |

*Primary Examiner*—Russell D. Stormer
*Attorney, Agent, or Firm*—Baker Botts L.L.P.

[57] ABSTRACT

A wheel for an inline skate type roller skate includes a wheel rim portion, a tread surface on the wheel rim portion and at least one ball bearing located entirely within the outer contour of the wheel. Disk-type seals mounted on the inner race of the ball bearing cover the axially outer surfaces of the bearing to protect the bearing against the entry of contaminants. The seals are also located entirely within the outer contour of the wheel.

6 Claims, 2 Drawing Sheets

WHEEL FOR ROLLER SKATES OF THE INLINE SKATE TYPE

BACKGROUND OF INVENTION

1. Field of the Invention

The invention concerns a roller skate of the inline skate type and a wheel for same, wherein the wheel has at least one bearing, in particular a ball bearing, which is arranged in a wheel rim portion.

2. The Prior Art

In a known construction of an inline skate wheel of the foregoing type, the wheel includes a wheel rim portion comprising plastic material or metal, in particular aluminum, a tread surface of plastic material arranged on the wheel rim portion, and respective ball bearings fitted into the wheel rim portion at each of the outward sides of the wheel, with a bearing seal, for example a sealing disk. Arranging the ball bearings at the outward sides of the wheel rim portions affords a large surface area for attack by the action of environmental influences. It is precisely due to typical use of the wheel in the open air that dirt and moisture can penetrate into the bearings and give rise to increased frictional forces and a greater amount of wear. Previously known sealing means, such as bearing or sealing disks, can only prevent contamination and fouling of the bearings to an unsatisfactory degree.

The object of the present invention is to develop a wheel of the aforementioned type in which the ball bearing of the wheel is protected effectively and better than hitherto from weather, dirt, moisture and mechanical influences.

SUMMARY

In accordance with the present invention, the foregoing and other objects are attained by the provision, in a wheel of the type referred to, of a ball bearing and sealing means therefor arranged within the outside contour of the wheel.

The advantages of the invention are in particular that the use of such sealing means provides that the ball bearing is effectively protected throughout the entire operating time against the penetration of dirt and the escape of lubricants. This ensures that the ball bearing operates in a trouble-free manner and attains a long service life. The arrangement of the sealing means and therewith also the ball bearing within the outside contour of the wheel affords those components a preferably secure position and shields them from mechanical loadings directly acting on them, such as knocks and impacts, which must also be reckoned to occur in normal use.

In a preferred embodiment of the wheel, there are provided two bearings in the form of ball bearings. That ensures a high axial load-bearing capability for the wheel.

In an alternative embodiment of the wheel, a single bearing is arranged approximately centrally in the wheel rim portion. That represents optimum protection from direct impacts and knocks against the bearing and affords sufficient space for sealing means.

In a particularly preferred configuration of the wheel according to the invention, the sealing means touches neither the wheel rim portion nor the outer race of the bearing so that the sealing means of the ball bearing does not give rise to any additional frictional forces which could reduce the usability of the wheel. It is therefore preferable to use seals which operate in a contact-free manner.

In a preferred embodiment, the sealing means is a labyrinth seal which operates in a contact-free and wear-free manner and which has a very good sealing action. The freedom from wear of that type of seal provides for a long service life.

In a particularly preferred embodiment, one or more wheels according to the invention are mounted on a roller skate of the inline skate type. In such an arrangement, in general four wheels are fixed one behind the other by means of axle bolts to holding members which are arranged at the underside of a shoe. In that way the mechanically movable parts of the roller skate are protected from environmental influences and the wear and frictional forces resulting therefrom. That ensures trouble-free operation of the entire roller skate over a long operating life.

BRIEF DESCRIPTION OF THE DRAWINGS

The invention will be described in greater detail hereinafter with reference to the drawings in which.

DETAILED DESCRIPTION

Figure 1:
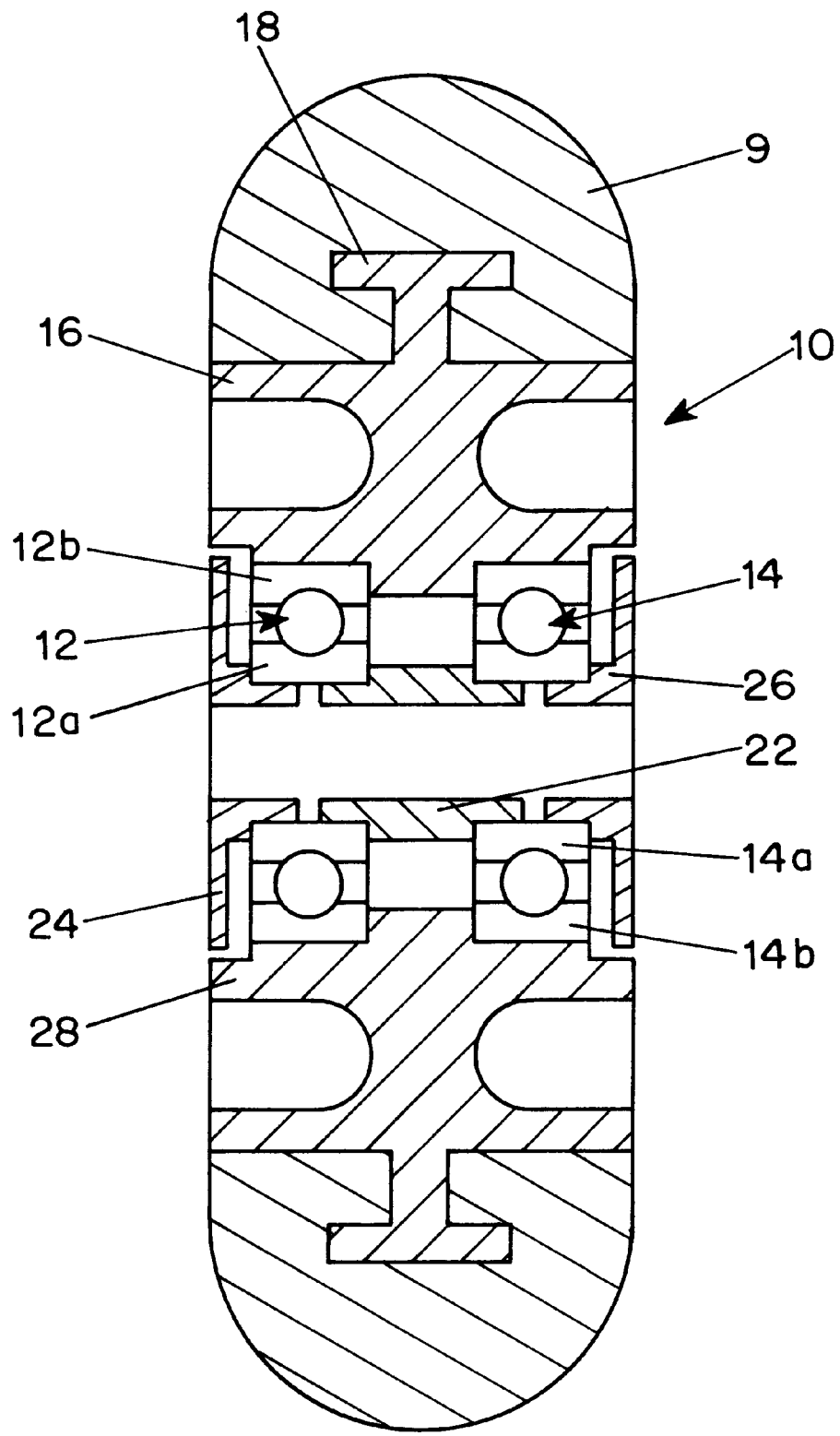
FIG. 1 shows a wheel with two inwardly disposed ball bearings in section through the axis of rotation thereof.

FIG. 1 shows a wheel 10 with two inwardly disposed ball bearings 12, 14. The wheel includes a wheel rim portion 16 which, at its radially outwardly directed surface, has a raised T-shaped portion 18 which serves as a holding member for the tread surface (tire) 20 which is mounted on the wheel rim portion, and prevents the tread surface from jumping off the wheel rim portion when a high lateral loading is involved.

The two ball bearings 12, 14 are arranged within the wheel rim portion 16 and are held by an annular bush 22 which is seated in the inside races 12a, 14a of the ball bearings 12, 14. The sealing disks 24, 26, in the form of a bearing bush and arranged at the outsides of the wheel, are seated in the inside races 12a, 14a of the ball bearings 12, 14 and cover the ball bearings without contacting the outside races 12b, 14b of the ball bearings or the wheel rim portion 16. As shown in FIG. 1, the sealing disks 24, 26 preferably lie entirely within the outside contour 28 of the wheel 10.

Figure 2:
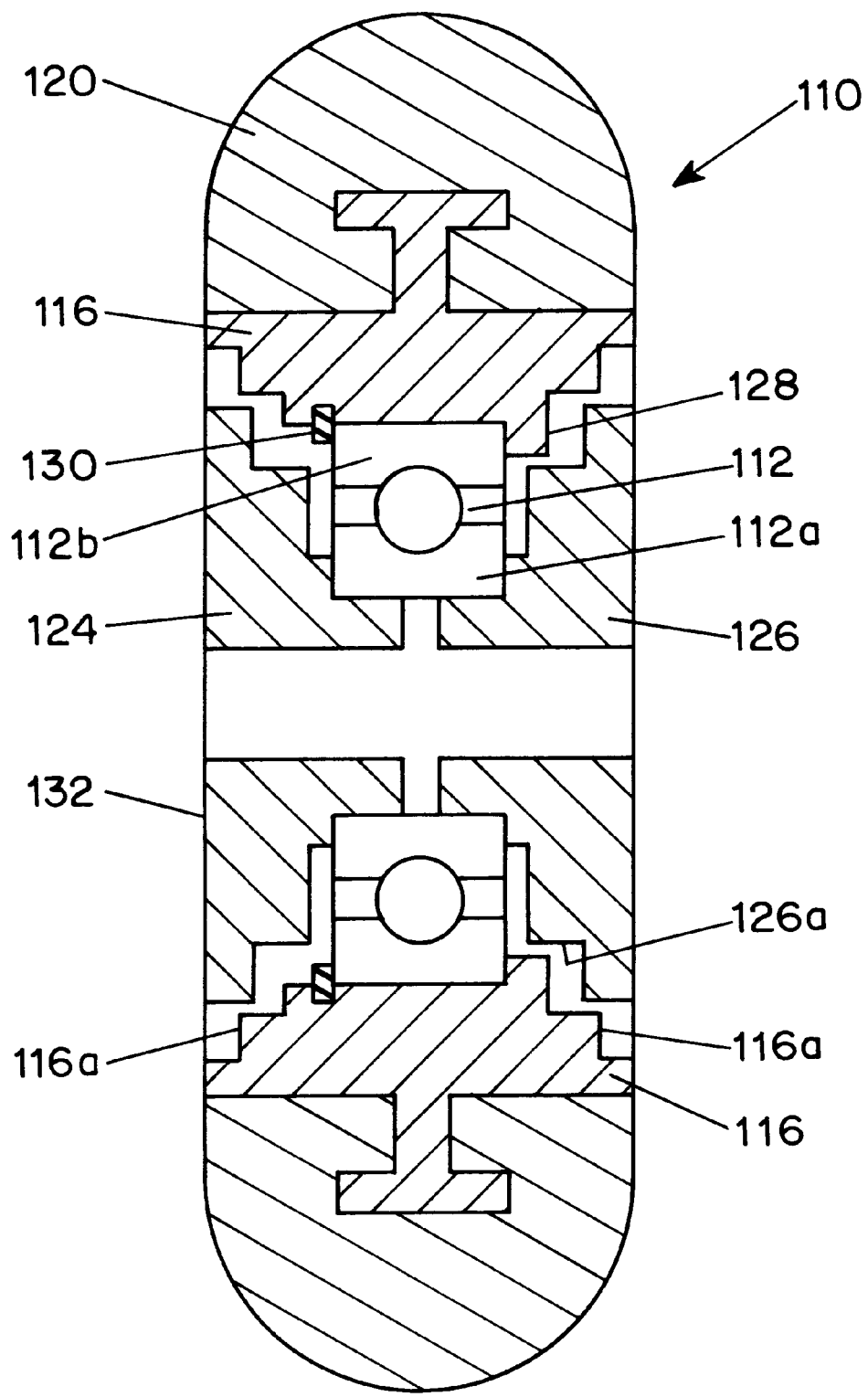
FIG. 2 shows a wheel with a centrally arranged ball bearing in section through the axis of rotation thereof.

In the embodiment of FIG. 2 (in which like parts are numbered as in FIG. 1 but increased by 100), the connection between the wheel rim portion 116 and the tread surface 120 which is mounted on the wheel rim portion is of the same configuration as described in relation to FIG. 1. However the internal shape of the wheel rim portion 116 in FIG. 2 differs from that shown in FIG. 1. The wheel rim portion 116 is of such a configuration that it can approximately centrally accommodate a single ball bearing 112 which is held on one side by an abutment 128 and on the other side by a securing ring 130 which is fitted into place in an annular groove in the wheel rim portion 116.

The sealing disks 124, 126 are in the form of bearing bushes and are seated at the outward sides of the wheel in the inner race 112a of the ball bearing 112. The facing labyrinth surfaces 124a, 126a of the sealing disks 124, 126 find their counterparts 116a in the shape of the wheel rim portion 116, to which they are juxtaposed with a small radial spacing therebetween, but without touching either the wheel rim portion 116 or the outer race 112b of the ball bearing 112. In this embodiment also, the sealing disks 124, 126 lie entirely within the outside contour 128 of the wheel 110.

We claim:

1. A wheel for inline type roller skates, comprising:
    a wheel rim structure having an axis of rotation and having spaced axially outer surfaces, the axially outer surfaces of said wheel rim defining, at least in part, the axially outer contour of said wheel rim, said wheel rim structure further including a plurality of concentric stepped recesses in the axially outer surfaces, said stepped recesses being substantially coaxial with the axis of rotation;

a ball bearing assembly located in the wheel rim, said ball bearing assembly having radially inner and outer ball-bearing races coaxial with said axis of rotation and a plurality of ball bearings seated therebetween; and a sealing disk on each axial side of the wheel rim, each said sealing disk being coaxial with said axis of rotation and having a concentric step arrangement including an outer diameter, an intermediate diameter and an inside diameter, said outer diameter being sufficiently large to cover the adjacent axial outer end of said outer ball bearing race without contacting the wheel rim at its periphery, said intermediate diameter being sufficiently large to cover an interface region of said inner and outer ball-bearing races, and said inner diameter being less than an outer diameter of the inner ball bearing races, said concentric step arrangement of the sealing means cooperating with the stepped recesses of the wheel rim and defining a labyrinthine passage between said axially outer surfaces of the wheel rim and said ball bearing assembly.

2. The wheel according to claim 1, wherein said sealing disks are releasable from said wheel rim.

3. The wheel according to claim 1, wherein said ball bearing assembly is centrally disposed within said wheel rim.

4. The wheel according to claim 1, wherein said wheel rim has a radially outwardly directed surface which comprises a raised T-shaped portion for further supporting a tire.

5. The wheel according to claim 1, wherein said wheel further comprises a tire mounted on said wheel rim, and said tire comprises a tread surface.

6. The wheel according to claim 1, further comprising a second ball bearing assembly, said first and second ball bearing assemblies being arranged within the axially outer contour of said wheel rim and spaced from each other along said axis of rotation of said wheel rim, and wherein one of said sealing disks covers said first ball bearing assembly and the other of said sealing discs covers said second ball bearing assembly on opposite axial sides of said wheel rim.

* * * * *